United States Patent
Kim et al.

(10) Patent No.: US 8,331,321 B2
(45) Date of Patent: Dec. 11, 2012

(54) TERMINAL, METHOD FOR HANDOVER THEREOF, AND SUPPORTING METHOD FOR HANDOVER OF BASE STATION

(75) Inventors: Won-Ik Kim, Daejeon (KR); Sung Cheol Chang, Daejeon (KR); Kwang Jae Lim, Daejeon (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 457 days.

(21) Appl. No.: 12/606,441

(22) Filed: Oct. 27, 2009

(65) Prior Publication Data
US 2010/0113031 A1    May 6, 2010

(30) Foreign Application Priority Data

Oct. 30, 2008  (KR) .................. 10-2008-0107176
Aug. 4, 2009   (KR) .................. 10-2009-0071800

(51) Int. Cl.
*H04W 4/00*  (2009.01)
*H04B 7/216* (2006.01)
*H04Q 7/20*  (2006.01)

(52) U.S. Cl. ........ 370/331; 370/335; 370/338; 455/425; 455/450

(58) Field of Classification Search ......... 370/310–475; 455/425–464, 522.2; 709/241–246; 375/219–352
See application file for complete search history.

(56) References Cited

U.S. PATENT DOCUMENTS

2009/0219888 A1* 9/2009 Chen et al. ................ 370/331
2009/0247170 A1* 10/2009 Balasubramanian et al. 455/445

FOREIGN PATENT DOCUMENTS

KR    10-2008-0014204 A    2/2008

OTHER PUBLICATIONS

Ju Yeop Kim et al., An Efficient Scheme for Scanning Neighbor Indoor BSs in Indoor Cell Coexisted OFDMA Cellular Systems, Apr. 25, 2008, JCCI2008.
Won-Ik Kim et al., IEEE C802.1m-08/1307r1, Scanning femtocells for macro-to-femto HO in IEEE 802.16m, Nov. 4, 2008.

* cited by examiner

*Primary Examiner* — Afsar M. Qureshi
(74) *Attorney, Agent, or Firm* — Jefferson IP Law, LLP

(57) ABSTRACT

A method for handover according to the present invention includes: requesting information on femto cells that are accessible by the terminal from a macro base station that manages the macro cells; receiving the femto cell information from the macro base station; and scanning neighboring femto cells based on the femto cell information.

14 Claims, 3 Drawing Sheets

TERMINAL, METHOD FOR HANDOVER THEREOF, AND SUPPORTING METHOD FOR HANDOVER OF BASE STATION

CROSS-REFERENCE TO RELATED APPLICATION

This application claims priority to and the benefit of Korean Patent Application Nos. 10-2008-0107176 and 10-2009-0071800 filed in the Korean Intellectual Property Office on Oct. 30, 2008 and Aug. 4, 2009, the entire contents of which are incorporated herein by reference.

BACKGROUND OF THE INVENTION (a) Field of the Invention

The present invention relates to a terminal, a method for handover thereof, and a supporting method for handover of a base station.

(b) Description of the Related Art

When a terminal moves from a cell managed by one base station to a cell managed by another base station, the terminal performs a handover procedure. At this time, the base station to which the terminal is originally connected broadcasts a base station list to be connected after the handover. The terminal scans the base station list and performs the handover based on the result.

Meanwhile, a femto cell means a region that provides a wireless communication service to areas within, for example, a 30 m radius. A femto base station managing the femto cell is installed at an office or a home.

A large number of femto cells may be overlapped within a macro cell that manages a cell having a larger area than that of the femto cell. When the terminal is handed over from a macro cell to the femto cell, a macro base station broadcasts a macro base station list, which manages neighboring macro cells, as well as a plurality of femto base station lists, which is overlapped in the corresponding macro cell, to the terminal. For this reason, the amount of information broadcasted by the macro base station is sharply increased, which imposes a heavy burden on the search procedure of the terminal receiving the information.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to minimize information broadcasted from a macro base station to a terminal and reduce a load in searching cells by the terminal when the terminal is handed over from macro cells to femto cells under an environment in which the plurality of femto cells are overlapped with the macro cells.

An exemplary embodiment of the present invention provides a method for handover of a terminal in a macro cell including a plurality of femto cells, including: requesting information on femto cells that are accessible by the terminal from a macro base station that manages the macro cells; receiving the femto cell information from the macro base station; and scanning neighboring femto cells based on the femto cell information.

The femto cell information may include public femto cell information or accessible private femto cell information.

The method for handover may further include receiving system information for handover.

The plurality of femto cells are divided into a plurality of femto groups, and the method may further include receiving a femto group preamble, which represents the plurality of femto groups, from the macro base station.

The method for handover may further include scanning the plurality of femto groups based on the femto group preamble.

The requesting of the femto cell information may further include transmitting an identifier of the terminal and an index of the femto group, to which the terminal belongs, among the plurality of femto groups.

The receiving of the femto cell information may include receiving the femto cell information of the femto group to which the terminal belongs.

Another embodiment of the present invention provides a supporting method for handover of a macro base station that manages macro cells including a plurality of femto cells, including: receiving information on femto cells that are accessible by a terminal from the terminal; and transmitting the femto cell information to the terminal.

The femto cell information may include public femto cell information or accessible private femto cell information.

The plurality of femto cells are divided into a plurality of femto groups, and the method may further include transmitting a femto group preamble, which represents the plurality of femto groups, to the terminal.

The receiving of the femto cell information may include receiving an identifier of the terminal and an index of the femto group, to which the terminal belongs, among the plurality of femto groups.

The transmitting of the femto cell information to the terminal may include transmitting the femto cell information to the femto group to which the terminal belongs.

Yet another embodiment of the present invention provides a terminal including: a transmitter that requests information on femto cells that are accessible from a macro base station that manages macro cells; a receiver that receives the femto cell information from the macro base station; and a detector that scans neighboring femto cells based on the femto cell information.

The femto cell information may include public femto cell information or accessible private femto cell information among the plurality of femto cells included in the macro cell.

The terminal may further include a memory that receives system information for handover.

The plurality of femto cells are divided into a plurality of femto groups, and the receiver may receive a femto group preamble that represents the plurality of femto groups.

The detector may scan the plurality of femto groups based on the femto group preamble.

The transmitter may transmit an identifier of the terminal and an index of the femto group to which the terminal belongs, among the plurality of femto groups.

The receiver may receive the femto cell information belonging to the femto group to which the terminal belongs.

According to an embodiment of the present invention, it is possible to minimize information broadcasted from a macro base station to a terminal and reduce a load in searching cells by the terminal, when the terminal is handed over from macro cells to femto cells under an environment in which the plurality of femto cells are overlapped with the macro cells.

DETAILED DESCRIPTION OF THE EMBODIMENTS

Figure 1:
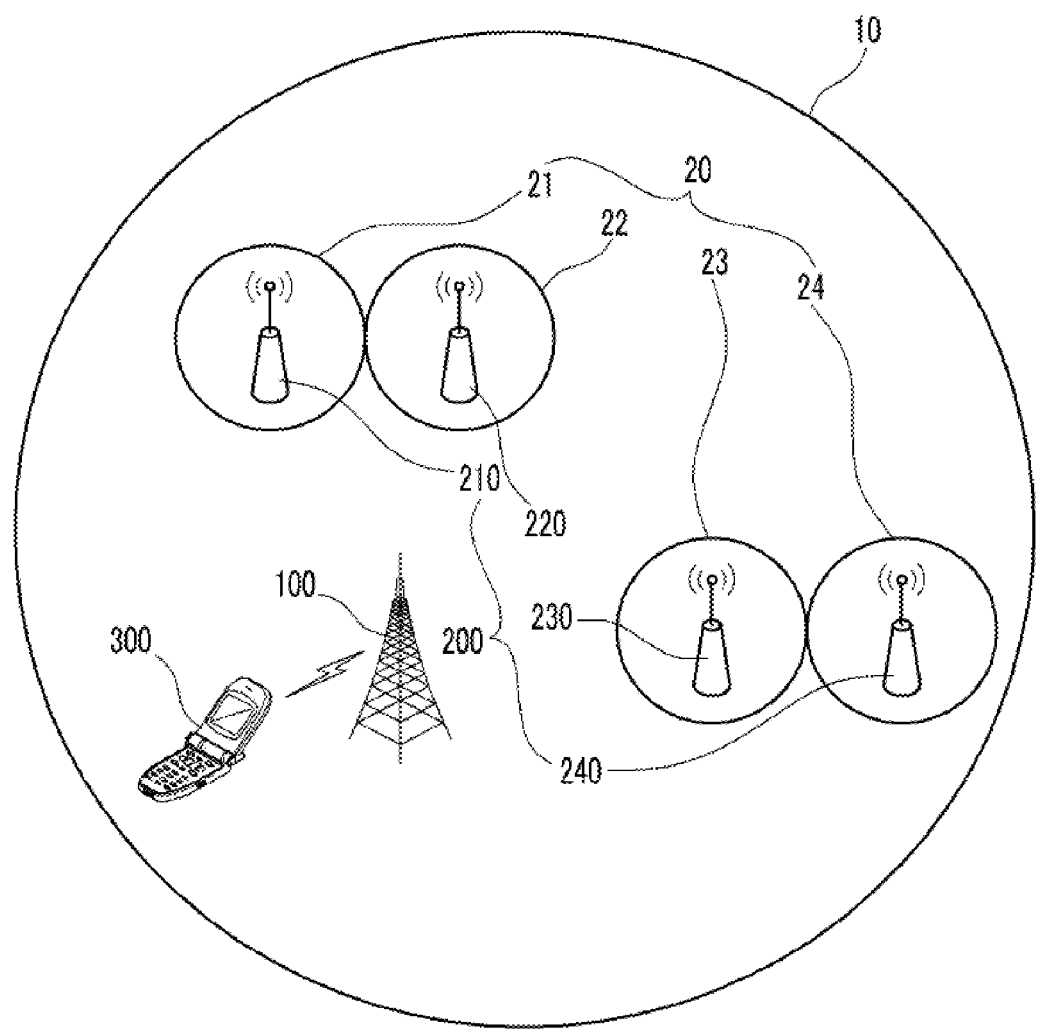
FIG. 1 is a schematic diagram showing a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the eNodeB, the base transceiver station, the MMR-BS, etc.

Hereinafter, a terminal, a method for handover of a terminal, and a supporting method for handover of a base station will be described in detail according to an exemplary embodiment of the present invention.

FIG. 1 is a schematic diagram showing a wireless communication system according to an exemplary embodiment of the present invention.

Referring to FIG. 1, a wireless communication system according to an exemplary embodiment of the present invention includes a macro base station 100, a plurality of femto base stations 200, and a terminal 300.

The macro base station 100 manages a macro cell 10. The macro cell 10 includes a plurality of femto cells 21, 22, 23, and 24 that are managed by a plurality of femto base stations 210, 220, 230, and 240. The macro cell 10 means a cell having a larger area than that of a femto cell 20, and is not limited to the dictionary definition of a macro.

The femto base station 200, which means a micro base station that provides a wireless communication service to an area of a 30 m range, manages the femto cell 20 and is installed in a shadowing area where a radio wave from other cells is degraded, for example inside a house or a building, to secure the quality of mobile communication service. The base station 200 and the femto cell 20 are not limited to the dictionary definition of femto, but is a term that covers both a micro base station having a name in a larger unit or a smaller unit and a micro cell.

The femto cell 20 is divided into private femto cells 21 and 22 and public femto cells 23 and 24.

The private femto cells 21 and 22 may be called a closed subscriber group (CSG), and are femto cells in which objects that are capable of transmitting and receiving data through the corresponding femto cell are previously set. The private femto cells 21 and 22 include an accessible private femto cell 21 that can transmit and receive data through the corresponding femto cell and an inaccessible private femto cell 22.

The public femto cells 23 and 24 are called a public subscriber group, and are femto cells in which objects that are capable of transmitting and receiving data through the corresponding femto cell are not previously set, and thus the public femto cells are permitted for all the terminals.

Meanwhile, the plurality of femto cells 20 may be divided into a plurality of femto groups. For example, the femto cell 20 included in, for example, one macro cell 10 may be divided into three femto groups, and this information may be included in a preamble broadcasted by the femto base station 200.

The terminal 300 is an end point of a radio channel, and is connected to the macro base station 100 or the femto base station 200 to transmit and receive data.

A method for handover according to an exemplary embodiment of the present invention will be described in detail with reference to FIG. 2.

Figure 2:
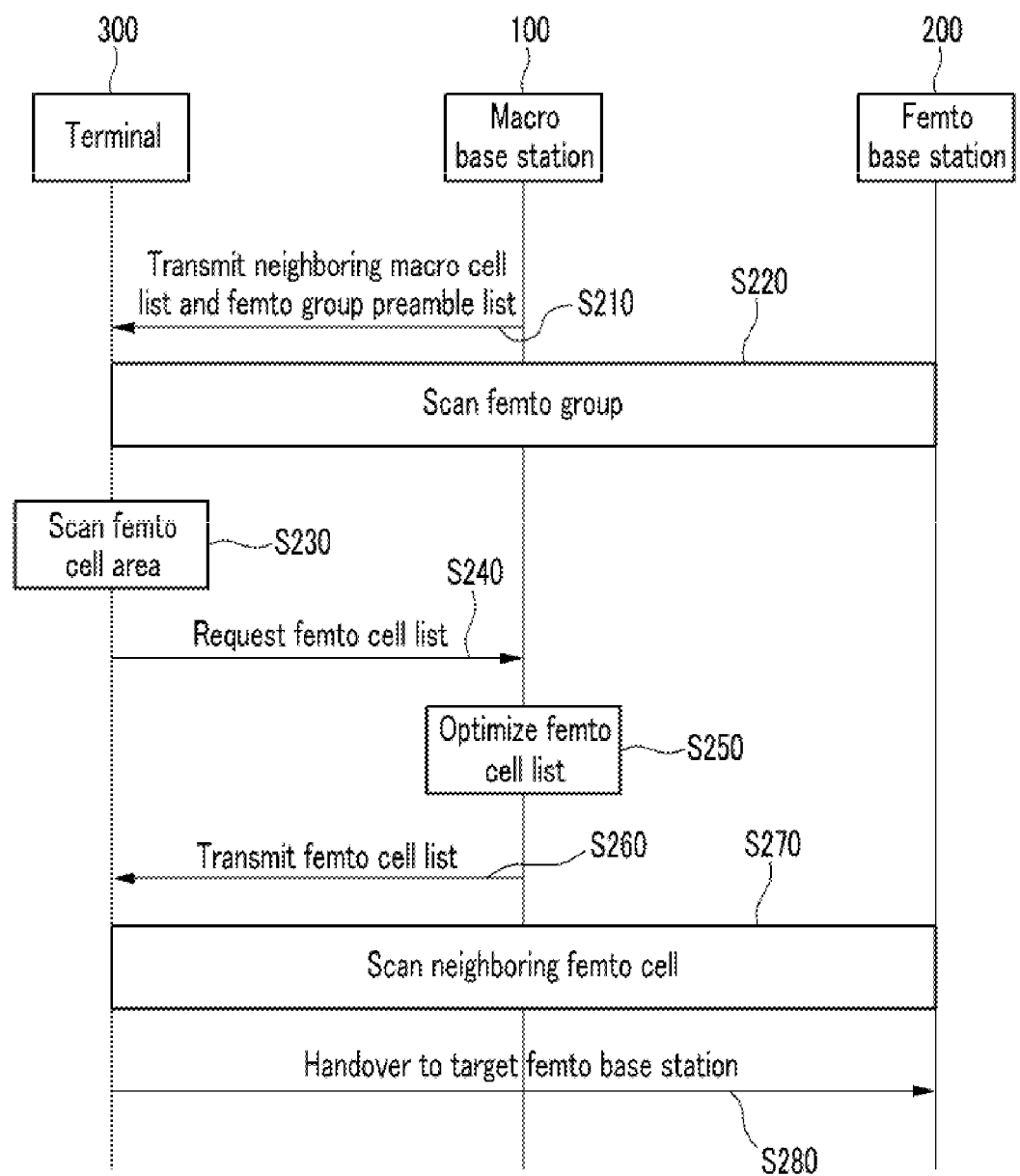
FIG. 2 is a flowchart sequentially showing a method for handover according to an exemplary embodiment of the present invention.

FIG. 2 is a flowchart sequentially showing a method for handover according to an exemplary embodiment of the present invention.

Referring to FIG. 2, a macro base station 100 transmits a neighboring macro cell list to a terminal 300, and transmits a femto group preamble list thereto (S210). The femto group preamble, which is a preamble transmitted from a femto base station 200, is a preamble to obtain a femto cell identifier and a received signal strength indication (RSSI) value, and represents which one of the plurality of femto groups includes the corresponding femto cell 20 by an index, etc.

Meanwhile, the neighboring macro cell list and the femto group preamble list are transmitted through a mobile neighbor advertisement (MOB_NBR_ADV) message.

The terminal 300 scans the group preamble from the femto base station 200 based on the received femto group preamble list (S220) to detect that the terminal 300 enters the femto cell area belonging to which femto group (S230).

Thereafter, the terminal 300 requests the femto cell list from the macro base station 100 (S240). At this time, the terminal 300 does not request all the femto cell lists existing in the macro cell 10, but requests the femto cell list belonging to one femto group detected among the plurality of femto groups.

The request of the femto cell list by the terminal is transmitted through a mobile femto cell request (MOB_FEM_REQ) message, and the MOB_FEM_REQ message may include the identifier of the requesting terminal 300 and the index of the requesting femto group.

The macro base station 100 optimizes the femto cell list to be transmitted to the terminal 300 (S250). Herein, in the optimizing (S250) of the femto cell list, the optimized femto cell list is the femto cell list belonging to the femto group requested by the terminal 300 among the plurality of femto cells 20, and in particular, the accessible private femto cell 21 and the public femto cells (23 and 24).

Then, the macro base station 100 transmits, that is, unicasts the optimized femto cell list to the requesting terminal 300 (S260). The transmission of the femto cell list of the macro base station 100 is performed through a mobile femto cell response (MOB_FEM_RSP) message.

Thereafter, the terminal 300 scans the neighboring femto cells based on the received femto cell list (S270) and performs a handover procedure to a target femto base station 200 (S280).

As described above, the femto cell 20 included in one macro cell 10 is divided into a plurality of femto groups, the terminal 300 requests the femto cell list belonging to the necessary femto group from the macro base station 100, and the macro base station 100 adopts a unicast scheme that transmits the femto cell list excluding the inaccessible femto cell 22 among the femto cells belonging to the corresponding femto group, thereby making it possible to reduce the amount of information transmitted from the macro base station 100 to the terminal 300. Further, the terminal 300 receives the optimized femto cell list and performs the scanning based thereon to reduce the load in scanning the neighboring femto cells, thereby making it possible to efficiently perform the scanning.

Hereinafter, a terminal according to an exemplary embodiment of the present invention will be described in detail with reference to FIG. 3.

Figure 3:
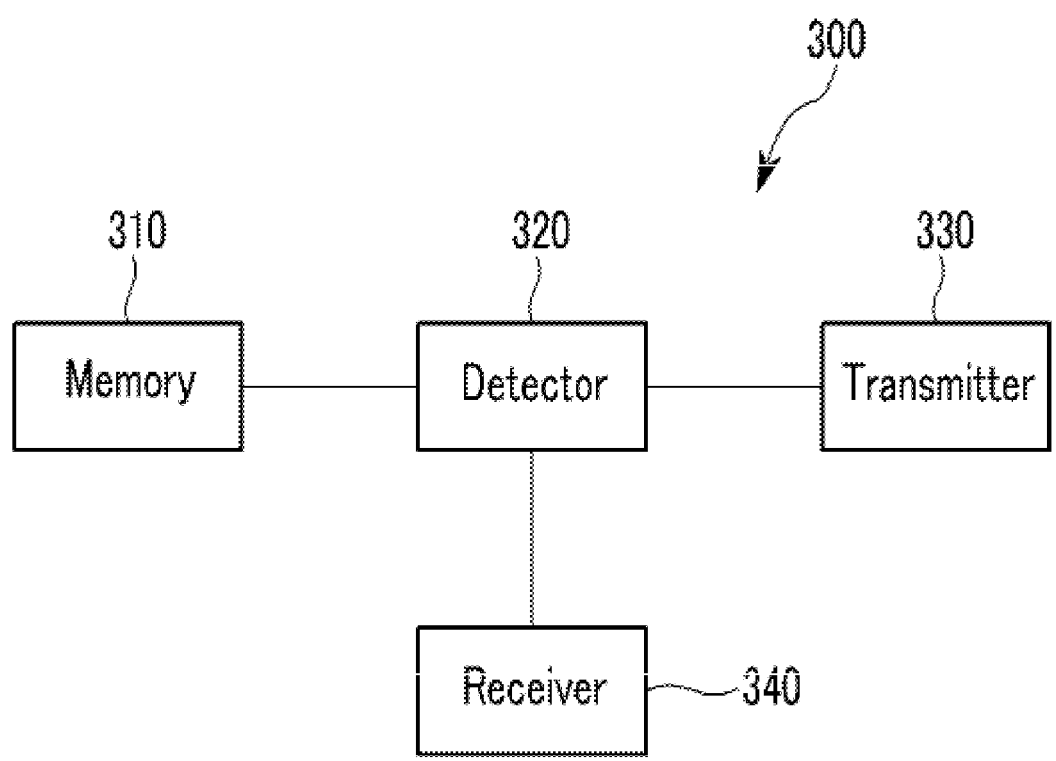
FIG. 3 is a schematic block diagram showing a terminal according to an exemplary embodiment of the present invention.

FIG. 3 is a schematic block diagram showing a terminal according to an exemplary embodiment of the present invention.

Referring to FIG. 3, a terminal 300 includes a memory 310, a detector 320, a transmitter 330, and a receiver 340.

The memory 310 stores system information transmitted from a network, wherein the system information may be mapping information of the macro base station 100 and the femto base station 200 that are necessary for handover. Further, the memory 310 can store the femto group preamble list and the femto cell list that are transmitted to the macro base station 100.

The detector 320 scans the femto group based on the femto group preamble list stored in the memory 310, or scans the neighboring femto cells based on the femto cell list.

The transmitter 330 requests the femto cell list from the macro base station 100, or transmits a signal necessary for handover to the macro base station 100 or the femto base station 200.

The receiver 340 receives the neighboring macro cell list, the femto group preamble list, and the femto cell list from the macro base station 100, and receives the signal necessary for handover from the macro base station 100 or the femto base station 200.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for handover of a terminal in a macro cell comprising a plurality of femto cells, comprising:

Scanning, by the terminal, a femto cell group which the terminal has entered based on femto group preambles received from a macro base station that manages macro cells;

requesting, by the terminal, femto cell list of the femto group which the terminal has entered to the macro base station;

receiving, by the terminal, the femto cell list excluding inaccessible femto cells by the terminal among femto cells of the femto group which the terminal has entered from the macro base station; and scanning neighboring femto cells based on the femto cell information.

2. The method for handover of claim 1, wherein
the femto cell list comprises public femto cell information or accessible private femto cell information.

3. The method for handover of claim 1, further comprising receiving system information for handover.

4. The method for handover of claim 1, wherein
the plurality of femto cells are divided into a plurality of femto groups, and
the method further comprises receiving a femto group preamble list, which represents a femto group preamble corresponding to each of the plurality of femto groups, from the macro base station.

5. The method for handover of claim 4, wherein the requesting the femto cell list further comprises
transmitting an identifier of the terminal and an index of the femto group, to which the terminal enters, among the plurality of femto groups.

6. A supporting method for handover of a macro base station that manages macro cells comprising a plurality of femto cells, comprising:

transmitting, by the macro base station, a femto group preamble list, which represents a femto group preamble corresponding to each of a plurality of femto groups, to a terminal;

receiving, by the macro base station, request of a femto cell list of the group which the terminal has entered from the terminal; and transmitting, by the macro base station, the femto cell list excluding inaccessible femto cells by the terminal among femto cells of the femto group which the terminal has entered to the terminal.

7. The supporting method for handover of claim 6, wherein
the femto cell list comprises public femto cell information or accessible private femto cell information.

8. The supporting method for handover of claim 6, wherein
the plurality of femto cells are divided into the plurality of femto groups.

9. The supporting method for handover of claim 8, wherein
the receiving of the femto cell list comprises
receiving an identifier of the terminal and an index of the femto group, to which the terminal belongs, among the plurality of femto groups.

10. A terminal comprising:

a transmitter that requests a femto cell list of a femto group which the terminal has entered to a macro base station that manages macro cells;

a receiver that receives the femto cell list, excluding inaccessible femto cells by the terminal among femto cells of the femto group which the terminal has entered, from the macro base station;

a receiver that receives a femto group preamble list, which represents a femto group preamble corresponding to each of a plurality of femto groups, and that receives the femto cell list from the macro base station, and A detector that scans the femto group which the terminal has entered based on femto groups preambles.

11. The terminal of claim 10, wherein the femto cell list comprises public femto cell information or accessible private femto cell information among the plurality of femto cells comprised in the macro cell.

12. The terminal of claim 11, further comprising a memory that receives system information for handover.

13. The terminal of claim 11, wherein the plurality of femto cells are divided into the plurality of femto groups.

14. The terminal of claim 11, wherein the transmitter transmits an identifier of the terminal and an index of the femto group to which the terminal enters, among the plurality of femto groups.

* * * * *